United States Patent [19]

Jimenez

[11] 4,184,418
[45] Jan. 22, 1980

[54] APPARATUS FOR PREPARING TACO SHELLS

[75] Inventor: James A. Jimenez, Temple City, Calif.

[73] Assignee: Electra Food Machinery, Inc., El Monte, Calif.

[21] Appl. No.: 922,652

[22] Filed: Jul. 7, 1978

[51] Int. Cl.² ............................................. A47J 37/12
[52] U.S. Cl. ......................................... 99/353; 99/404; 99/407; 99/427; 99/443 C
[58] Field of Search .................. 99/353, 404, 407, 427, 99/443 C, 405, 428, 431

[56] References Cited

U.S. PATENT DOCUMENTS

| 3,267,836 | 8/1966 | Yepis | 99/353 X |
| 3,570,393 | 3/1971 | Schy | 99/353 X |
| 3,667,372 | 6/1972 | Hilvitz | 99/404 |
| 3,680,474 | 8/1972 | Brown | 99/404 X |
| 3,722,400 | 3/1973 | Jimenez | 99/353 |
| 3,763,764 | 10/1973 | Schy | 99/404 X |
| 3,766,846 | 10/1973 | Jimenez | 99/427 X |
| 3,785,273 | 1/1974 | Stickle | 99/427 X |
| 3,880,065 | 4/1975 | Stickle | 99/404 X |
| 3,946,655 | 3/1976 | Schy | 99/407 X |

Primary Examiner—Billy J. Wilhite
Attorney, Agent, or Firm—James E. Brunton

[57] ABSTRACT

An improved apparatus for preparing taco shells from uncooked tortillas comprising a vessel having shaped side walls for containing cooking oil, a conveyor assembly including a deformable endless wire mesh belt for moving the tortillas through the cooking oil and a plurality of mold members cooperatively associated with the conveyor assembly for forming the tortillas into taco shells.

In operation of the apparatus, the wire mesh belt slides along, and is controllably deformed by the shaped side walls of the vessel thereby minimizing the amount of cooking oil which is used. An additional novel feature of the apparatus resides in the unique arrangement for removing the formed taco shell directly from the rearward end of the apparatus after it has been cooked and depositing it onto an auxillary conveyor for transport to a packaging station.

6 Claims, 5 Drawing Figures

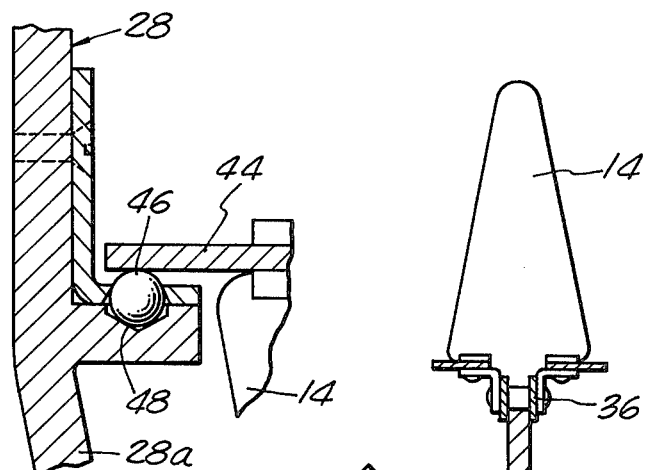
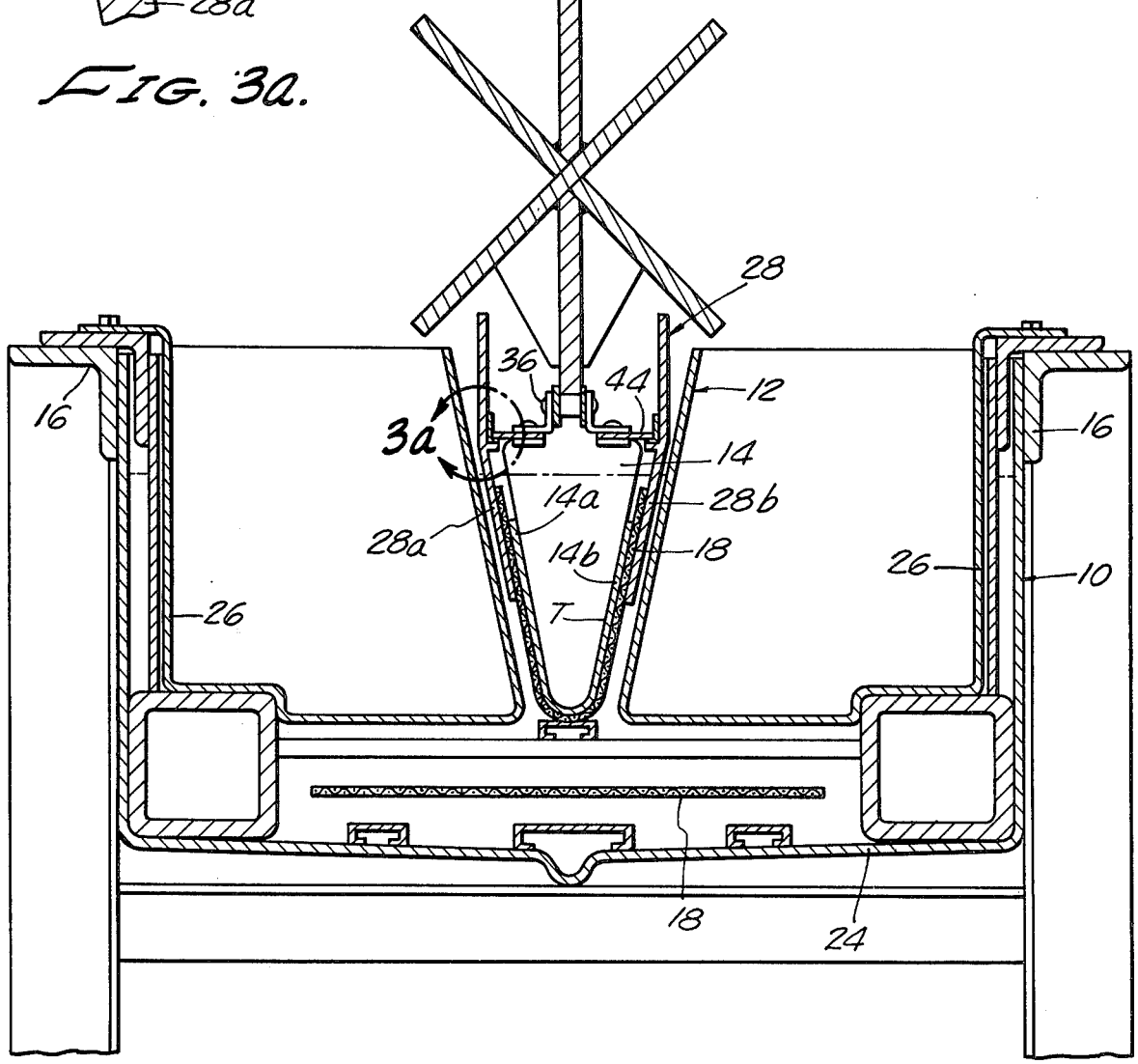
FIG. 3.
FIG. 3a.

APPARATUS FOR PREPARING TACO SHELLS

BACKGROUND OF THE INVENTION

1. Field of the Invention

This invention relates generally to an apparatus for heating and forming sheet material and more particularly to a food cooking apparatus for preparing a V-shaped Mexican food product known as a taco shell.

2. Description of the Prior Art

A taco is a popular Mexican food made by folding a tortilla (a thin, flexible, round cake made from corn flour dough called "masa") into a V-shaped shell, frying it crisp, and stuffing it with various fillings. The technology of this application deals with machines for automatically shaping and cooking the tortillas to make them into taco shells.

Masa is made by mixing corn flour with about an equal weight of water. A tortilla is made by shaping masa into a relatively thin pancake-shaped disk, which is cooked enough to cohere the product, but leave it flexible. Tortillas are made into various sizes, from a few inches in diameter up to two feet. However, most tortillas are between 3 and 9 inches in diameter. Typically the tortilla is fried for 20–30 seconds in hot (350° F. to 400° F.) cooking oil to form a crisp taco shell.

The cooking oil is an edible vegetable oil (usually coconut oil, soybean oil, or cottonseed oil) which is subject to deterioration by oxidation during the cooking process.

The masa tortilla is extremely fragile and must be moved with great care
tear. Similarly after cooking the tortilla, now in the form of a taco shell, must be carefully removed from the apparatus and gingerly transported to a remote station for packaging.

Prior to this invention various types of apparatus for preparing taco shells have been developed. A common drawback of the prior art devices is their inability to automatically produce, in a trouble-free manner, large quantities of taco shells of uniform high quality.

Other drawbacks of the prior art devices include the use of inordinately large quantities of cooking oil and, in certain cases, the highly undesirable necessity of operator handling of the food product at various points during the cooking and packaging process.

One of the most successful prior art devices ever developed is described in my previously issued U.S. Pat. No. 3,766,846. The apparatus of the present invention constitutes an improvement of the apparatus described in this patent.

In addition to the prior art devices described and cited in my previously issued patent, I am familiar with the following patents which comprise the closest art of which I am aware and serve to clearly illustrate the novelty of the present invention:

U.S. Pat. Nos. 3,880,065—Stickle;
3,763,764—Schy;
3,680,474—Brown.

SUMMARY OF THE INVENTION

It is an object of my invention to provide a fully automatic apparatus for heating and forming a thin sheet of fragile material in which the sheet material is carried forwardly through a vessel containing a limited amount of fluid at elevated temperatures and is accurately formed into the desired end product configuration without damaging the material and without the necessity of the operator handling the material during the forming process.

It is another object of my invention to provide an apparatus of the type described in the preceding paragraph in which the sheet material is automatically removed from the rearward end of the vessel after the heating operation and is deposited onto an auxilliary conveyor for transport to a packaging station.

It is a further object of my invention to provide an apparatus which has the ability to handle very fragile and delicate sheet material such as tortillas in which the tortillas are protectively supported in a generallly V-shaped configuration of predetermined dimensions while being automatically carried through a cooking vessel containing cooking oil at elevated temperatures.

It is still another object of my invention to provide an apparatus of the aforementioned character in which the conveyor system comprises an endless, deformable, flexible wire mesh belt adapted to cooperate with a plurality of spaced apart rigid mold elements to form the tortillas into the desired shape.

It is a further object of my invention to provide an apparatus of the type described in the preceding paragraph in which the bottom walls of the cooking vessel slidably support the conveyor belt and vary transitionally in cross-section from a substantially planar configuration at the forward end of the apparatus into a V-shaped configuration and then once again into a substantially planar configuration at the rearward end of the apparatus thereby minimizing the amount of cooking oil contained in the cooking vessel.

It is still another object of the invention to provide an apparatus of the character described in which the wire mesh conveyor belt functions to urge the cooked taco shells upwardly along spaced apart guide rods for deposition onto an auxilliary conveyor disposed adjacent the rearward end of the apparatus.

It is another object of my invention to provide an apparatus of the aforementioned character which is highly reliable, safe to operate and easy to clean and maintain.

BRIEF DESCRIPTION OF THE DRAWINGS

FIG. 3 is a greatly enlarged cross-sectional view of the central portion of the apparatus taken along lines 3—3 of FIG. 1.

FIG. 3a is an enlarged fragmentary view of the portion of the apparatus designated as 3a in FIG. 3.

BRIEF DESCRIPTION OF ONE EMBODIMENT OF THE INVENTION

Figure 1:
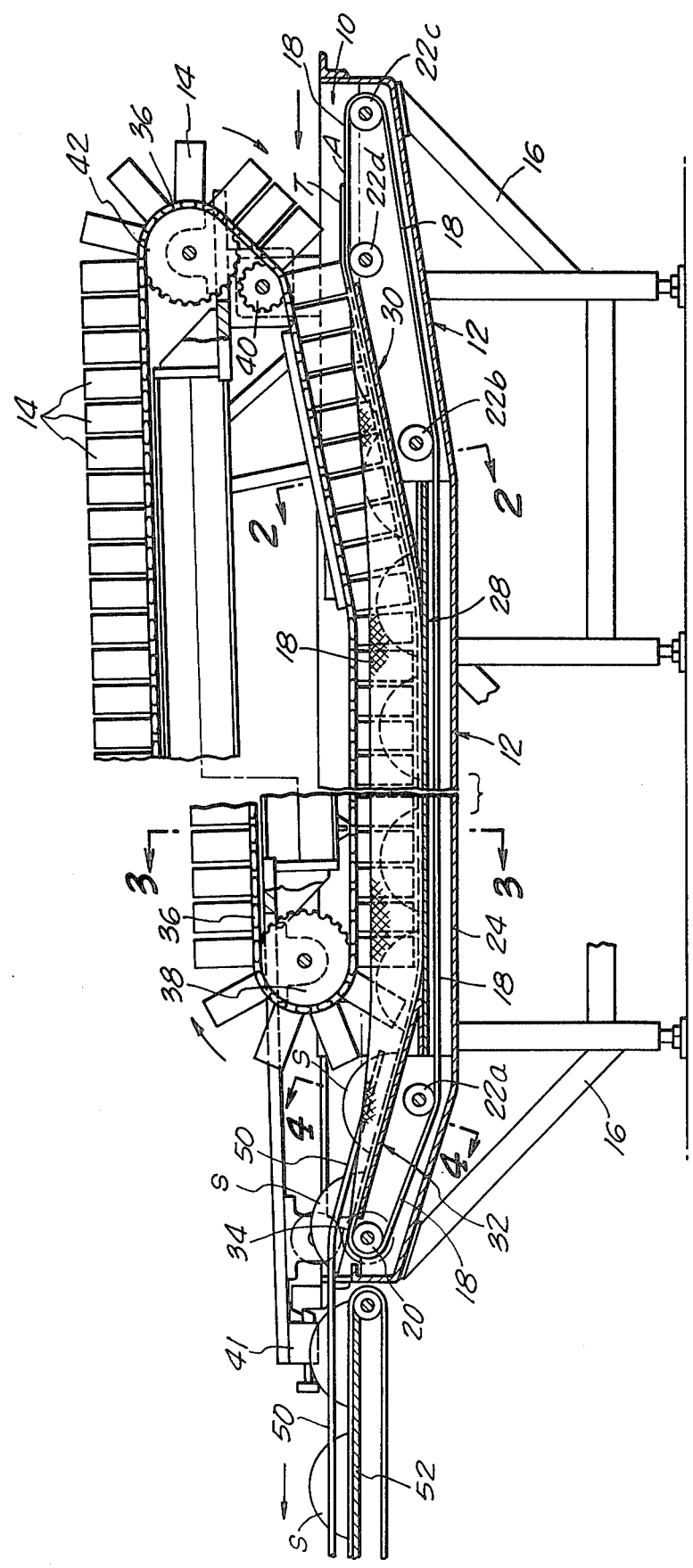
FIG. 1 is a foreshortened side elevational view of one form of the apparatus of my invention for preparing taco shells shown partly in section to illustrate the arrangement of the various elements which cooperate in the preparation process.

Referring to the drawings, and particularly to FIGS. 1 and 3 the apparatus of one form of the invention comprises an outer housing 10, a vessel or tank 12 disposed within housing 10 for containing cooking oil, a first conveyor means for moving the tortillas through the cooking oil and a plurality of mold members 14 affixed to a second conveyor means and adapted to cooperate with the first conveyor means for forming the tortillas into taco shells. Housing 10 is supported on a rigid framework 16 and vessel 12 is provided with means for heating the oil such as gas heaters, emersion heaters or the like (not shown).

The first conveyor means comprises a flexible, endless wire mesh belt 18 entrained over a drive roller 20 and a plurality of longitudinally spaced apart idler rollers 22. Roller 20 is driven in a conventional manner by a motor drivably coupled therewith through a suitable gear reduction means (not shown). As illustrated in FIG. 3, belt 18 is deformable from a substantially flat configuration into a V-shaped configuration corresponding to the shape of mold members 14.

Referring to FIGS. 1 through 4 it can be seen that during operation of the apparatus, belt 18 travels over drive roller 20 in a counter clockwise direction, passes through the cooking tank to the right (FIG. 1) beneath idler rollers 22a and 22b, travels around idler roller 22c and then moves forwardly of the apparatus over idler roller 22d. During this portion of its travel belt 18 is maintained in a substantially flat configuration.

Figure 2:
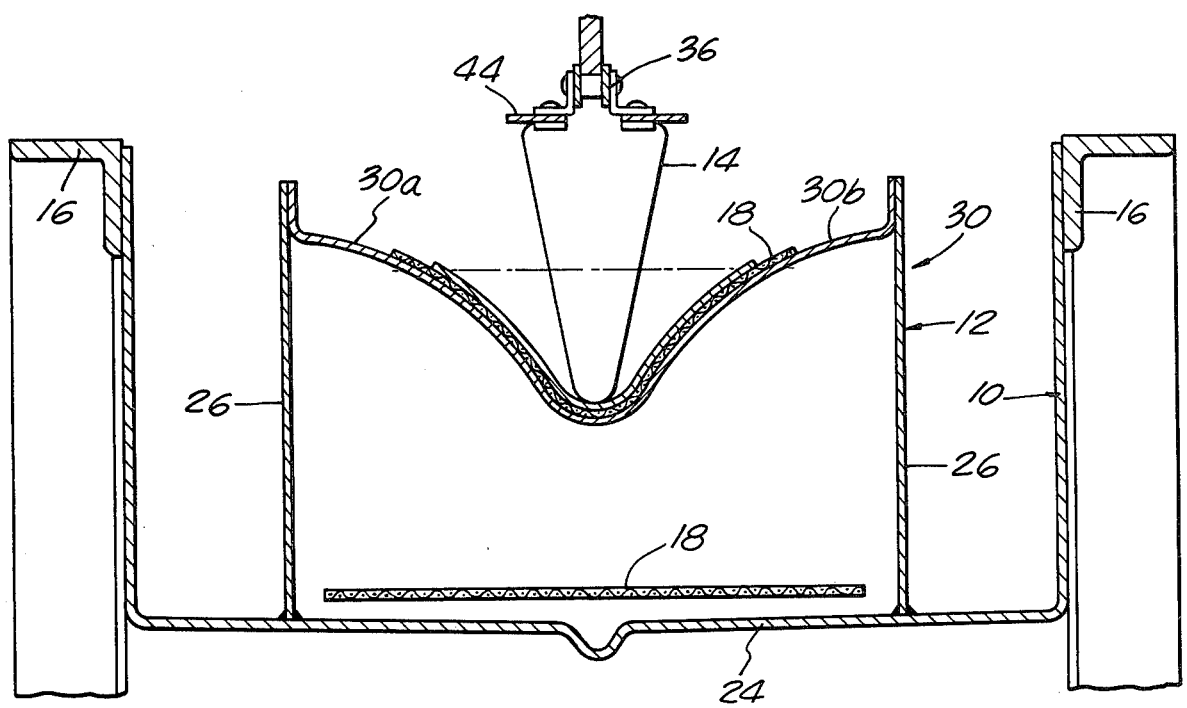
FIG. 2 is an enlarged cross-sectional view of the forward portion of the apparatus taken along lines 2—2 of FIG. 1.
Figure 4:
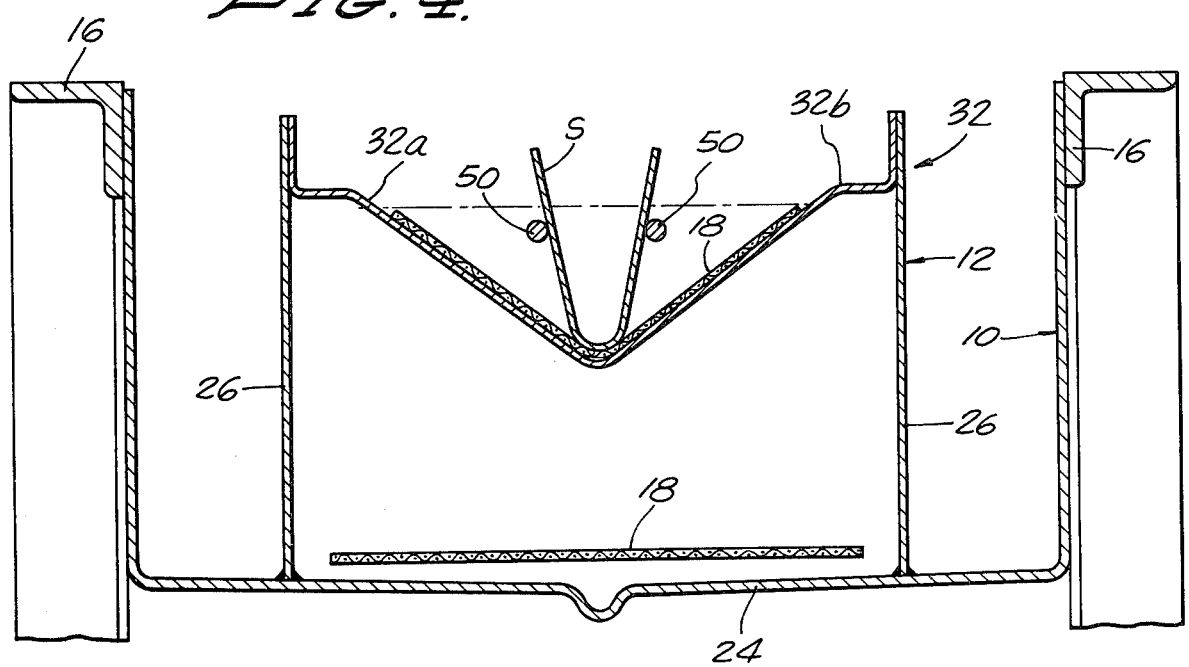
FIG. 4 is an enlarged cross-sectional view of the rearward portion of the apparatus taken along lines 4—4 of FIG. 1.

As best seen in FIGS. 2 through 4, tank 12 includes interconnected bottom and side walls 24 and 26 respectively. Disposed within tank 12 are three longitudinally spaced cooperating belt shaping sections having guide surfaces transistionally varying in cross-sectional configuration from being substantially flat to being steeply inclined relative to horizontal.

As indicated in FIG. 3, the guides surfaces 28a and 28b of center section 28 slope at a rather steep angle generally corresponding to the angle defined by the side walls 14a and 14b of the mold members 14. The guide surfaces 30a and 30b of the rightward most section 30 vary transitionally in cross-section first from a substantially planar configuration into the shallow V-shaped configuration shown in FIG. 2 and then into a generally steep V-shaped configuration in the area where section 30 joins center section 28. The cross-sectional configuration of the guide surfaces 32a and 32b of the leftward most section 32, on the other hand, transitionally varies gradually from a steep V-shaped configuration at the point where this section joins center section 28 into the shallow V-shaped configuration shown in FIG. 4.

During the forward travel of wire mesh belt 18 through tank 12, it is at all times in engagement with the guide surfaces of the three belt shaping sections and is adapted to conform to the shape thereof. Accordingly, during forward travel of the belt through the tank, its cross-sectional configuration, along with that of the tortillas carried thereon, will change first from being generally flat into being gently curved, and then into being substantially V-shaped. As seen in FIG. 3, when the tortilla is in its V-shaped configuration it closely conforms to the angle of the side walls of the forming members 14.

After passing through the center section of the tank wherein belt 18 is held in close proximity with the mold member 14 by side walls 28a and 28b (FIG. 3), belt 18 will pass through a gently V-shaped configuration into a substantially flat configuration at the point 34 where it travels arond drive roller 20 (FIG. 1). With the construction shown only a minimum amount of cooking oil is needed to fill the cooking vessel.

Referring again to FIG. 1, V-shaped mold members 14 can be seen to be affixed to a second conveyor means comprising an endless chain 36 which is entrained over and driven by a drive sprocket 38. Sprocket 36 is driven by any conventional drive means connected with a suitable motor and if desired can be driven by the same motor which drives roller 20. During operation of the apparatus, chain 36 travels around the drive sprocket, moves rearwardly, or to the right, through tank 12, under sprocket 40 and then travels upwardly around sprocket 42, and then forwardly toward drive sprocket 38.

Chain 36 and mold members 14, which are connected thereto, in an operating configuration are posisitoned relative to belt 18 and tank 12 so that as belt 18 and chain 36 travel forwardly of the apparatus through the cooking tank, the mold members will be positioned in close proximity with belt 18. It is to be observed that for cleaning and maintenance purposes, the second conveyor means, including chain 30 and mold members 14, is pivotable about a transversely extending pivot axis disposed proximate the forward end of the apparatus. A latching mechanism 41 disposed at the rearward end of the apparatus (FIG. 1) locks the conveyor means in its operating configuration. When the latching mechanism is released the left end of the conveyor assembly may be swung upwardly relative to the vessel.

Referring to FIG. 3, as chain 36 moves through the center section of the tank, the mold members 14 will travel between walls 28a and 28 b with the tortilla "T" being held against the side walls 14a and 14b of the mold members by the upper surface of wire mesh belt 18.

The manner in which the mold members 14 are connected to chain 36 is illustrated in FIG. 3 and 3a. As there shown, wing like extensions 44 extend outwardly at either side of the mold members. During travel of chain 36 through the center section of tank 12 these wing members engage longitudinally spaced apart ball bearings 46 carried by a raceway 48 extending inwardly from walls 28a and 28b. This arrangement assures smooth travel of the mold members through the tank and guarantees their correct vertical positioning relative to belt 18.

In operation of the apparatus, with the cooking oil in tank 12 at the level indicated by the broken lines and at the proper elevated temperature and with belt 18 and chain 36 being driven by drive roller 20 and sprocket 38 respectively, tortillas "T" are placed on belt 18 at the loading area designated by the letter "A" in FIG. 1. From this point the tortillas will be carried by belt 18 downwardly into the cooking oil. The guide surfaces of the belt shaping section 30 will form both the belt and the tortillas thereon into a V-shape generally corresponding to the V-shape of the side walls of the mold members 14 so that as the belt moves into the center belt shaping section 28 it will pass between surfaces 28a and 28b. Movement of belt 18 between the guide surfaces urges the tortillas into engagement with the mold members so that during the cooking operation they are securely held in the desired taco shell configuration. After the belt clears center section 28, it will move into engagement with the guide surface of belt shaping section 32 and will return to a generally flat configuration before passing around drive roller 20.

Referring to FIGS. 1 and 4, as the belt 18 returns to its flat configuration, the now cooked taco shells "S" will continue to be moved forwardly of the apparatus by belt 18 and will be held in an upright configuration by longitudinally extending, curved guide bars 50. When the taco shells "S" reach the forwardmost point of the cooking tank they are transferred to a third conveyor means 52 which carries them to the packaging station.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for preparing taco shells from uncooked tortillas comprising:
   (a) a cooking vessel for containing cooking oil, said vessel including guide surfaces positioned within said vessel, said guide surfaces varying transitionally in cross-section from a first substantially planar configuration into a shallow V-shaped configuration, then into a second generally steep V-shaped configuration and finally into a third substantially planar configuration;
   (b) a first conveyor means comprising a flexible endless mesh belt adapted to slidably engage said guide surfaces for moving the tortillas through said cooking vessel;
   (c) mold means adapted to cooperate with said first conveyor means to encapsulate the tortilla between said first conveyor means and said mold means whereby the tortilla is shaped between said first conveyor means and said mold means as said first conveyor means is formed into a substantially V-shape by said guide surfaces; and
   (d) guide means adapted to engage the cooked taco shell and to cooperate with said first conveyor means to remove the taco shell from said cooking vessel.

2. The apparatus as defined in claim 1 in which said mold means comprises a plurality of spaced apart, rigid V-shaped mold members affixed to a second conveyor means adapted to move said mold members through said cooking vessel at the same rate of speed as the tortillas carried by said first conveyor means.

3. The apparatus as defined in claim 1 in which said guide means comprises a pair of longitudinally extending spaced apart, curved, upwardly extending guide rods disposed in close proximity with said first conveyor means.

4. An apparatus for preparing taco shells from uncooked tortillas comprising:
   (a) a cooking vessel having exterior walls and interior sloping walls disposed within said vessel for containing cooking oil, said interior walls having guide surfaces being constructed to vary transitionally in cross-section from a first substantially planar configuration into a shallow V-shaped configuration, then into a second generally steep V-shaped configuration and finally into a third substantially planar configuration;
   (b) a first conveyor means comprising a longitudinally extending, endless wire mesh belt adapted to slidably engage said guide surfaces for moving the tortillas through said cooking vessel;
   (c) mold means adapted to cooperate with said first conveyor means to encapsulate the tortilla between said first conveyor means and said mold means whereby the tortilla is shaped there between as said first conveyor means is formed into a substantially V-shape by said guide surfaces, said mold means comprising a plurality of spaced apart, rigid V-shaped mold members affixed to a second conveyor means adapted to move said mold members through said cooking vessel synchronously with said first conveyor means; and
   (d) guide means adapted to engage the cooked taco shell and to cooperate with said first conveyor means to remove the taco shell from said cooking vessel, said guide means comprising a pair of longitudinally extending spaced apart, curved, upwardly extending guide rods disposed in close proximity with said first conveyor means.

5. An apparatus as defined in claim 4 including a raceway affixed to said guide surfaces and a multiplicity of ball bearings carried in said raceway.

6. An apparatus as defined in claim 5 in which said mold members are provided with wing like extensions adapted to rollably engage said ball bearings carried in said raceway.

* * * * *